United States Patent [19]
Bedi et al.

[11] Patent Number: 5,155,708
[45] Date of Patent: Oct. 13, 1992

[54] ACOUSTIC WAVE SENSOR AND METHOD OF MAKING SAME

[76] Inventors: Ram L. Bedi, 146 N. 7th St., San Jose, Calif. 95112; Alan R. Selfridge, 2592 Middlefield Rd., Palo Alto, Calif. 94301

[21] Appl. No.: 661,075

[22] Filed: Feb. 26, 1991

[51] Int. Cl.[5] .......................................... H04R 17/00
[52] U.S. Cl. ................................. 367/152; 367/157; 310/337; 310/322
[58] Field of Search ................. 367/152, 157, 140; 310/337, 322; 73/10 V

[56] References Cited

U.S. PATENT DOCUMENTS

| | | | |
|---|---|---|---|
| Re. 32,123 | 4/1986 | Knight | 367/127 |
| 4,140,936 | 2/1979 | Bullock | 310/328 |
| 4,254,354 | 3/1981 | Keem | 310/329 |
| 4,460,841 | 7/1984 | Smith et al. | 310/334 |
| 4,578,611 | 3/1986 | Sadler | 310/338 |
| 4,656,481 | 4/1987 | Mawhinney | 342/171 |
| 4,779,244 | 10/1988 | Horner et al. | 367/140 |
| 4,782,469 | 11/1988 | Granz et al. | 367/157 |
| 4,803,671 | 2/1989 | Rochling et al. | 367/166 |

*Primary Examiner*—J. Woodrow Eldred
*Attorney, Agent, or Firm*—Townsend and Townsend

[57] ABSTRACT

A hydrophone for calibrating lithotripters includes a spot poled disc of piezoelectric material which is mounted on a brass cylinder backing. A coaxial cable is electrically connected to one surface of the disc through the brass backing and the opposing surface of the disc. A mixture of polymeric material and microballoons is provided to protect the interconnection of the center conductor and the opposing surface of the disc and prevent damage due to the incident ultrasonic shock waves. The brass backing is placed in a suitable housing of phenolic material. A process in fabricating the piezoelectric disc and assembling the hydrophone is disclosed.

13 Claims, 2 Drawing Sheets

ACOUSTIC WAVE SENSOR AND METHOD OF MAKING SAME

BACKGROUND OF THE INVENTION

This invention relates generally to acoustic wave sensors such as hydrophones as used in calibrating lithotripters.

Lithotripters are medical shock wave devices which are used to disintegrate kidney and gall bladder stones. In an extracorporeal lithotripsy system, a shock wave transducer or spark discharge shock wave source generates shock waves which are focused and transmitted to a patient through a suitable fluid coupling medium. By positioning the stones in a patient at the focal point of the shock waves, the shock waves are transmitted to and disintegrate the stones.

The lithotripters must be properly calibrated prior to use. This is typically done by transmitting the focused shock waves in a fluid container and moving an acoustic sensor or hydrophone in the container to locate the true focal point and to measure the strength of the focused acoustic wave. A conventional hydrophone uses electrodes on a thin membrane to measure the shock waves. However, quite often the thin membrane will develop a dent in the active region after only a few shocks. This will adversely affect the response rise time and reproducibilty characteristics of the hydrophone. In order to prolong the life of such hydrophones, the thin membrane has been sandwiched between two layers of glycerine as a protective shield. However, this structure drastically changes the shape of the measured waveform, especially the negative (rarefactional) pressure region.

Another embodiment of conventional hydrophones is the reflector style design which basically consists of a ceramic or polymeric active element backed by a high acoustic impedance. The hydrophones built by the ceramic crystal in this manner have yielded high sensitivities coupled with acceptable rise times. The life span of such hydrophones is considerably improved over the membrane style hydrophones. However, this design will not detect negative pressures, and difficulties are associated in attempting to obtain a small, well defined active area.

SUMMARY OF THE INVENTION

An object of the present invention is an improved acoustic wave sensor.

Another object of the invention is a hydrophone having high sensitivity and robustness.

Still another object of the invention is a hydrophone having a fast rise time and being capable of sensing negative pressure.

A further object of the invention is a method of making an improved piezoelectric acoustic wave sensor.

A feature of the invention is the use of a spot poled piezoelectric ceramic as an acoustic transducer.

Briefly, in accordance with the invention a disc of piezoelectric ceramic is suitably shaped in diameter and thickness for a particular frequency of acoustic wave to be sensed. A portion of the disc is polarized by selectively metallizing its major surfaces initially and then subjecting the disc to an electric field. This action aligns the randomly oriented ferroelectric dipoles in the piezoelectric material between the metal layers. Thereafter, the disc is mounted on an acoustically matched backing, such as a brass cylinder, with the grounded side of the disc and the cylinder in electrical and physical contact. The cylinder is secured in a housing such as a phenolic material using a general purpose epoxy. A coaxial line then interconnects the active spotted side of the disc and the grounded cylinder backing to suitable signal processing equipment.

The invention and objects and features thereof will be more readily apparent from the following detailed description and appended claims when taken with the drawings.

DETAILED DESCRIPTION OF ILLUSTRATIVE EMBODIMENTS

Figure 1:
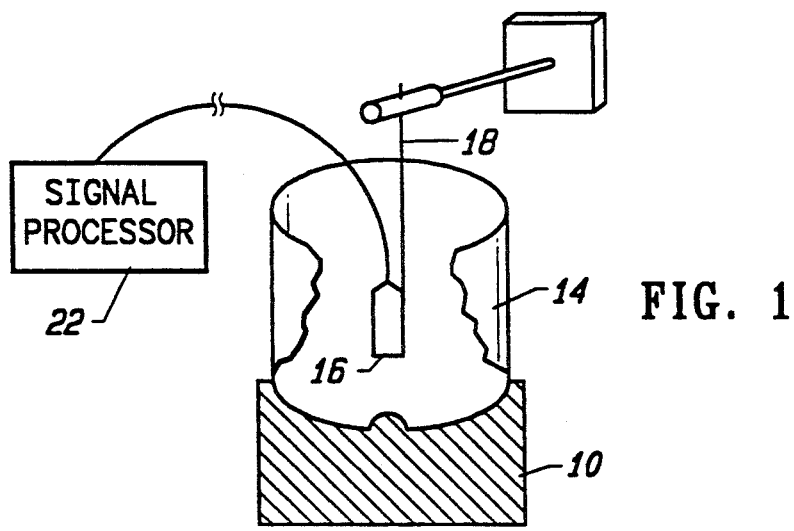
FIG. 1 is a side elevation view partially in section illustrating a hydrophone in accordance with an embodiment of the invention in a lithotripter calibration system.

Referring now to the drawing, FIG. 1 is a side elevation view partially in section illustrating a hydrophone in accordance with one embodiment of the invention in a lithotripter calibration system. A conventional lithotripter 10 is provided under a container 14 filled with a suitable fluid, such as water, for transmitting ultrasonic waves. The hydrophone 16 suspended by rod 18 in container 14 can be moved in the x, y and z direction relative to the lithotripter so as to locate the focal point.

The pressure generated by the lithotripter can exceed 1,000 atmospheres at the focus. Thus, an accurate record of the output must be kept before a patient is subjected to treatment. In the illustrated apparatus, the hydrophone 16 is iteratively moved in the X, Y, and Z directions at low power to locate the focal region of the lens. The transducer is then fired at high power and the resulting voltage registered by a signal processor 22.

Figure 2A:
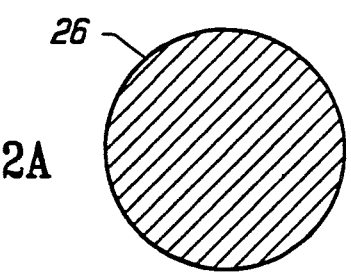
FIGS. 2A and 2B illustrate opposing sides of a piezoelectric ceramic sensor as used in the hydrophone of FIG. 1.
Figure 2B:
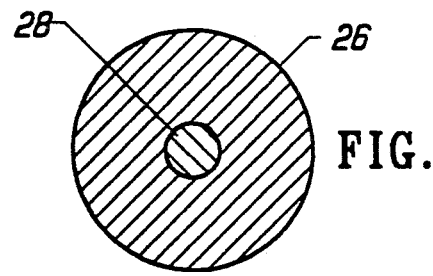

In accordance with a preferred embodiment of the invention and as illustrated in FIGS. 2A and 2B, the hydrophone 16 includes a spot poled disc 26 of piezoelectric material which can be a ceramic such as lead titanate. In one embodiment for sensing an acoustic wave at 15 megahertz, the disc is 0.328 inch in diameter and is lapped to a thickness of 0.006 inch. A thinner disc results in a higher frequency response (i.e. shorter rise time). As shown in FIG. 2A, a first major surface of disc 26 is coated with a combination of 100 angstroms of chromium followed by 2,000 angstroms of gold. The opposing major surface as illustrated in FIG. 2B has a limited region 28 of a similar combination of chromium-gold metal of 0.040 inch in diameter. A smaller aperture than 0.040" in diameter would improve the resolution and provide a wider angular response. After this region is polarized, a second layer of the same combination of chromium-gold is applied and overlies the entire second surface including the limited metal layer 28.

Figure 3:
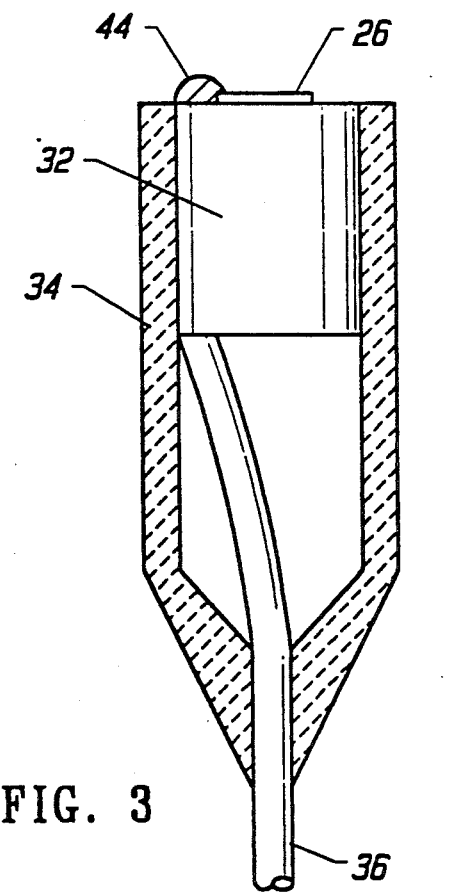
FIG. 3 is a side view in section of the hydrophone of FIG. 1.

FIG. 3 is a side view in section of the hydrophone 16 of FIG. 1. The first surface of disc 26 is affixed to a support surface on a brass cylinder backing 32 with the first metal layer in physical and electrical contact with the backing 32. Backing 32 is selected to provide acoustic impedance matching with the piezoelectric disc. The backing is then mounted within a housing 34 which can comprise a phenolic material, with a coaxial cable 36 extending into the housing 34. The outer conductor of coaxial cable 36 electrically contacts the backing 32, and the center conductor is connected to the second surface of the disc 26.

Figure 4:
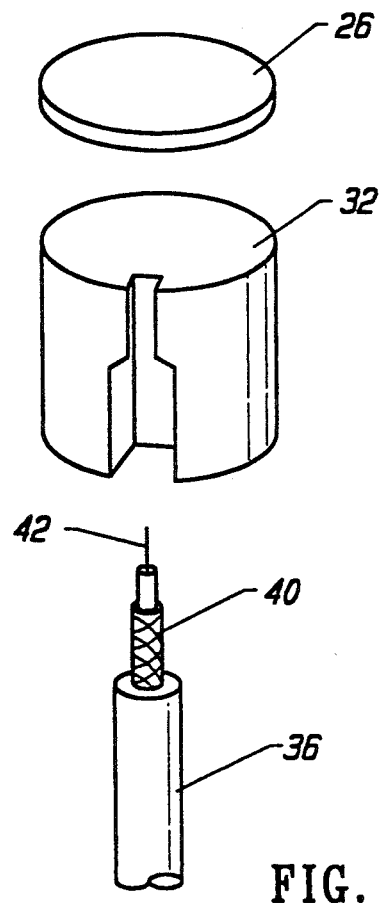
FIG. 4 is an exploded isometric view of the cable, backing, and disc of the hydrophone of FIG. 1.

FIG. 4 is an exploded isometric view of the coaxial cable 36, backing 32, and disc 26. A longitudinal slot is provided in the brass cylinder 32 and is suitably shaped to receive the coaxial cable 36. Electrical insulation on the outer surface of the coaxial cable 36 is removed near one end thereby exposing the outer coaxial conductor 40 and the inner coaxial conductor 42. The outer conductor 40 is physically and electrically attached to the brass cylinder 32 by silver epoxy. A small wire is soldered to the center conductor 42 and to the top of the spot poled disc 26. In accordance with a feature of the invention, a mixture of 50% by volume of polymeric material and microballoons shown generally at 44 in FIG. 3 is cast over the wire and solder connections thereby protecting the wire and solder from destruction by the shock waves to be measured.

Figure 5:
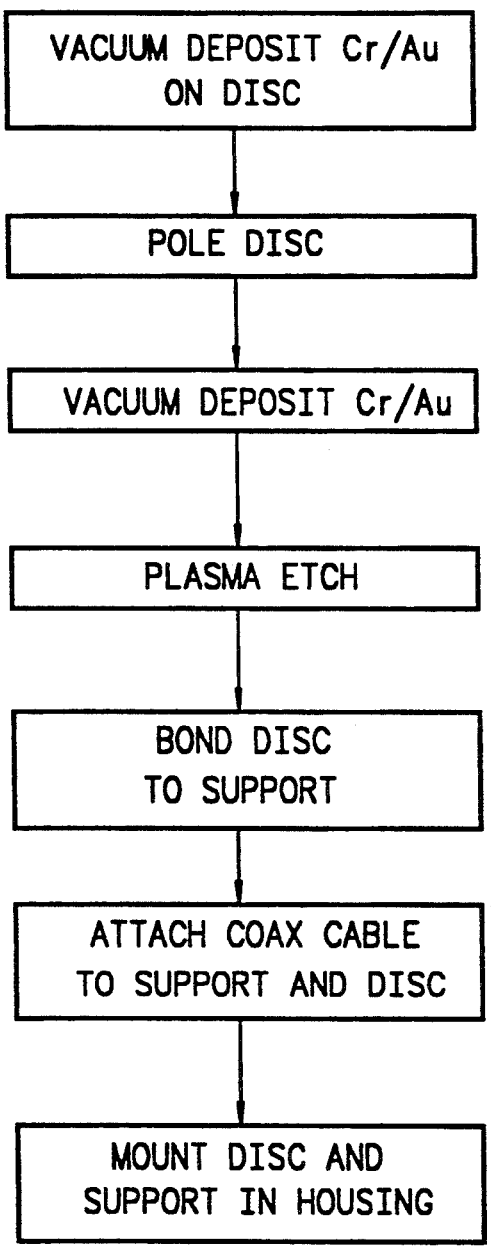
FIG. 5 is a flow diagram illustrating steps in fabricating the hydrophone of FIG. 1.

FIG. 5 is a flow diagram illustrating steps in fabricating one embodiment of the acoustic sensor and hydrophone. First a disc of unpoled piezoelectric material such as lead titanate (EC 97 from EDO Western Corporation) of suitable dimensions is provided as noted above. The metal layers of chrome and gold are deposited on one surface of the disc and on the limited region of the opposite surface of the disc through use of conventional masking and evaporation techniques. The disc is then positioned in an electric field of 100 volts/0.001 inch while the disc is immersed in Fluorinert FC-71 heated to 220° C. This step, called spot poling, establishes polarization in the disc between only the two metal layers. Subsequently, a combination of chromium and gold is applied over the entire surface of the disc. The gold plating is then removed from the edges of the crystal by sanding.

Thereafter, the disc and the brass backing are plasma etched in a vacuum chamber to clean the surfaces to be bonded. The disc and brass backing are then affixed together using an epoxy bond using Hysol RE2039/HD3561 epoxy. The bond is made immediately after removing the components from the vacuum chamber in order to reduce the risk of contamination of the surfaces and possible early failure of the bond. Electrical contact between the brass and the crystal disc is established by making the epoxy bond between the two components thinner than the roughness of both surfaces. Since the electrode and microscopically rough surface of the crystal pushes through the epoxy, ohmic contact is obtained between the ground side of the spot poled crystal and the brass backing.

Next, the ground braid outer conductor of RG174 coaxial cable is silver epoxied to the slot in the brass backing. Once cured, the brass backing is glued to the phenolic housing with a general purpose epoxy. Finally, a small wire is soldered to the center conductor of the coaxial cable at one end and to the top of the spot poled crystal at the other end.

In accordance with another feature of the invention, the fragile soldered joint between the center conductor of the coaxial cable and the top electrode of the spot poled ceramic is protected by a mixture of 50% by volume ratio of RTV118 polymer material and microballoons (Emerson Cummings IGD 101) which is applied over the wire and solder connections thereby protecting them from destruction by the shock waves to be measured.

Hydrophones made in accordance with the invention exhibit good rise times and provide sensitivities significantly better than the conventional membrane hydrophones. The theoretical rise time is simply the time needed to completely compress the thickness of the active element (i.e. the thickness of the crystal divided by its longitudinal velocity). For EC 97, the longitudinal velocity is about 5.08 mm/us, which will give rise times of about 30 ns for the 0.006 inch crystals described hereinabove. Hydrophones in accordance with the invention have been aged to well over 500 shots and data gathered over this period had a standard deviation in the peak voltage of under 2%. The shape of the recorded waveform hardly changed. The only damage sustained by the hydrophone was a slight deepening of the microscopic craters on the surface of the crystal.

While the invention has been described with reference to a specific embodiments, the description is illustrative of the invention and is not to be construed as limiting the invention. For example, other piezoelectric ceramics can be used in fabricating the sensor, such as Lead Zirconate Titanate and Lithium Niobate. Materials used here (EC97 or PC11 sold by Hitachi Metal Ltd.) are chosen specifically for their lack of coupling to radial modes of vibration, which can cause spurious signals. Thus, various modifications and applications may occur to those skilled in the art without departing from the true spirit and scope of the invention as defined by the appended claims.

What is claimed is:

1. An acoustic wave transducer comprising
   a disc of piezoelectric material having first and second major surfaces, said disc having a limited area spot poled therein, a first metal layer on said first major surface, and a second metal layer on said second major surface,
   a solid acoustically matched backing for said disc, said backing having an electrically conducting support surface for said disc,
   means affixing said first major surface of said disc on said support surface with said first metal layer electrically contacting said support surface, and said support surface providing an electrical contact to said disc, and
   a coaxial cable having a center conductor electrically connected to said second metal layer adjacent the periphery of said disc and an outer conductor electrically connected to said first metal layer on said disc through said support surface.

2. The acoustic wave transducer as defined by claim 1 wherein said ceramic is lead titanate.

3. The acoustic wave transducer as defined by claim 1 wherein said backing comprises a metal cylinder.

4. The acoustic wave transducer as defined by claim 3 wherein said metal cylinder is brass.

5. The acoustic wave transducer as defined by claim 3 wherein said metal cylinder has a longitudinal slot for accommodating said coaxial cable, said coaxial cable having an outer conductor electrically contacting said metal cylinder, and a center conductor with means electrically connecting said second metal layer and said inner conductor.

6. The acoustic wave transducer as defined by claim 5 and further including a mixture of polymeric material and microballoons protecting said means electrically connecting said center conductor and said second metal layer.

7. The acoustic wave transducer as defined by claim 6 and further including a housing in which said backing is housed.

8. The acoustic wave transducer as defined by claim 7 wherein said housing comprises a phenolic material, and further including an epoxy for affixing said metal cylinder in said housing.

9. The acoustic wave transducer as defined by claim 8 wherein said means affixing said first major surface of said disc on said support surface comprises a non-conductive epoxy bond, said first major surface and said support surface being sufficiently roughened to electrically contact each other through said non-conductive epoxy.

10. The acoustic wave transducer as defined by claim 1 wherein said means affixing said first major surface of said disc on said support surface comprises a non-conductive epoxy bond, said first major surface and said support surface being sufficiently roughened to contact each other through said non-conductive epoxy.

11. A hydrophone for use in calibrating a lithotripter comprising a body of piezoelectric material having two major surfaces, a polarized region in said body between said surfaces, and metallization on said two major surfaces, an electrically conducting cylindrical brass backing for said body, means physically attaching said body on said backing with said body and said backing being in electrical contact, a coaxial cable having a center conductor electrically connected to said metallization on one of said two major surfaces adjacent the periphery of said body and an outer conductor electrically connected to metallization on the other of said two major surfaces through said backing, and a housing in which said cylindrical brass backing is housed.

12. The hydrophone as defined by claim 11 wherein said means physically attaching said body on said backing comprises a non-conductive epoxy bond, said body and said backing being sufficiently roughened to electrically contact each other through said non-conductive epoxy.

13. The hydrophone as defined by claim 12 wherein said body of piezoelectric material comprises lead titanate.

* * * * *